United States Patent
Krause

(10) Patent No.: US 7,149,606 B2
(45) Date of Patent: Dec. 12, 2006

(54) SYNCHRONIZING CONTROLLERS LINKED BY A COMMUNICATIONS NETWORK

(75) Inventor: Kenneth W. Krause, Rochester Hills, MI (US)

(73) Assignee: Fanul Robotics America, Inc., Rochester Hills, MI (US)

( * ) Notice: Subject to any disclaimer, the term of this patent is extended or adjusted under 35 U.S.C. 154(b) by 165 days.

(21) Appl. No.: 11/069,126

(22) Filed: Mar. 1, 2005

(65) Prior Publication Data
US 2006/0200254 A1 Sep. 7, 2006

(51) Int. Cl.
*H01H 43/00* (2006.01)
*G05B 19/18* (2006.01)
*G05B 19/418* (2006.01)
*G06F 1/04* (2006.01)
*G06F 1/12* (2006.01)

(52) U.S. Cl. ............... 700/306; 700/3; 700/14; 700/20; 700/248; 702/79; 702/89; 702/176; 713/375; 713/400; 375/106; 375/145; 375/149; 318/705

(58) Field of Classification Search ............. 700/2–3, 700/20, 14, 170, 248, 306; 702/79, 89, 176; 713/375, 400; 318/705; 375/106, 145, 149, 375/240.28
See application file for complete search history.

(56) References Cited

U.S. PATENT DOCUMENTS

| | | | | |
|---|---|---|---|---|
| 4,330,826 A | * | 5/1982 | Whiteside et al. | 714/12 |
| 4,342,083 A | * | 7/1982 | Freedman et al. | 709/253 |
| 6,009,360 A | * | 12/1999 | Knapp | 701/29 |
| 6,535,926 B1 | * | 3/2003 | Esker | 709/248 |
| 6,760,687 B1 | | 7/2004 | Apel et al. | |
| 6,804,580 B1 | * | 10/2004 | Stoddard et al. | 700/248 |
| 6,807,461 B1 | * | 10/2004 | Kneifel et al. | 700/248 |
| 2002/0183864 A1 | | 12/2002 | Apel et al. | |
| 2004/0249571 A1 | * | 12/2004 | Blesener et al. | 701/301 |

* cited by examiner

*Primary Examiner*—Ramesh Patel
(74) *Attorney, Agent, or Firm*—Butzel Long

(57) ABSTRACT

A control system includes controllers that are coupled mutually by a communications network, on which information, transmitted from a master controller to a slave controller, is used to make timing corrections on the slave controller in order to synchronize event timers on the slave controller with that of the master controller. Timing accuracy for the occurrence of the event commanded by each controller is synchronized in narrow range of time, preferably within a few milliseconds depending on the specific application and system.

20 Claims, 2 Drawing Sheets

SYNCHRONIZING CONTROLLERS LINKED BY A COMMUNICATIONS NETWORK

BACKGROUND OF THE INVENTION

The present invention relates generally to coordinating the timing of commands issuing from electronic controllers connected in a network. More particularly it pertains to actions or events performed by actuators, such as robots, in response to commands from a controller, which commands are synchronized with commands produced by at least one other controller.

As robot systems become more sophisticated, a need arises for multiple robots to work together on a given task. For example if one robot is holding a workpiece on which another robot will perform an operation, the motions of both robots must be precisely coordinated to efficiently accomplish that task.

The conventional way to accomplish close coordination of robot manipulators is to connect them to the hardware of the same controller. This technique can be applied to a limited number of axes of motion or degrees of freedom. It is difficult for a robot manufacturer to provide all of the possible combinations and permutations of groups of robot manipulators and servo systems.

To overcome these shortcomings, multiple controllers can be used to control a multi-armed system of robot manipulators. Each controller and manipulator in the system can be generic, and the number of robots in the system can be very large because of the flexibility of networked controllers. But each controller requires an independent timing system, a principal shortcoming of this approach. To make full use of the capabilities of a multi-robot system, a common time reference is preferred.

Some prior art systems provide common timing through the use of hardware, a technique that requires the clocks of all of the robot controllers be interconnected. One such hardware mechanism, embodied in IEEE-1588 protocol, employs a specific mechanism to provide common timing in hardware. Another mechanism in the prior art involves highly precise clock circuits. The hardware required for each of these is specialized and expensive.

SUMMARY OF THE INVENTION

Although hardware can be used to coordinate timing that is accurate to within microseconds among electronic controllers interconnected by a communications network, that degree of accuracy is not necessary in systems for controlling industrial robots.

The present invention provides common timing information among the controllers in software via a standard multipurpose communications network. No special hardware is required. The clock on each controller need not be precise, and it may run independently of the clock on any other controller. Slave or shadow controllers communicate with a master controller to periodically determine timing corrections, which are used to update a shadow tick count on the slave controllers. This technique enables event command signals produced by each networked controller to be synchronized within a few milliseconds of each other.

A method and system according to the present invention can be applied to a controller of robots and to other actuators and manipulators that respond to electronic command signals.

A method according to this invention synchronizes the occurrences of events in a system of controllers interconnected by a communications network. The method includes the steps of maintaining on a master controller and a slave controller a respective count of ticks produced by a clock on each controller. A target tick count at which a future event is to occur is established. The slave controller repetitively sends an inquiry to the master controller for the current tick count on the master controller, and the master controller responses to the slave controller with the current tick count on the master controller. On the basis of the current tick count transmitted from the master controller and the length of the inquiry-response transmission period, a shadow tick count on the slave controller is established and incremented by the clock ticks on the slave controller. The master controller commands the event upon the occurrence of the target tick count on the master controller, and the slave controller commands the event when the shadow tick count matches the target tick count.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
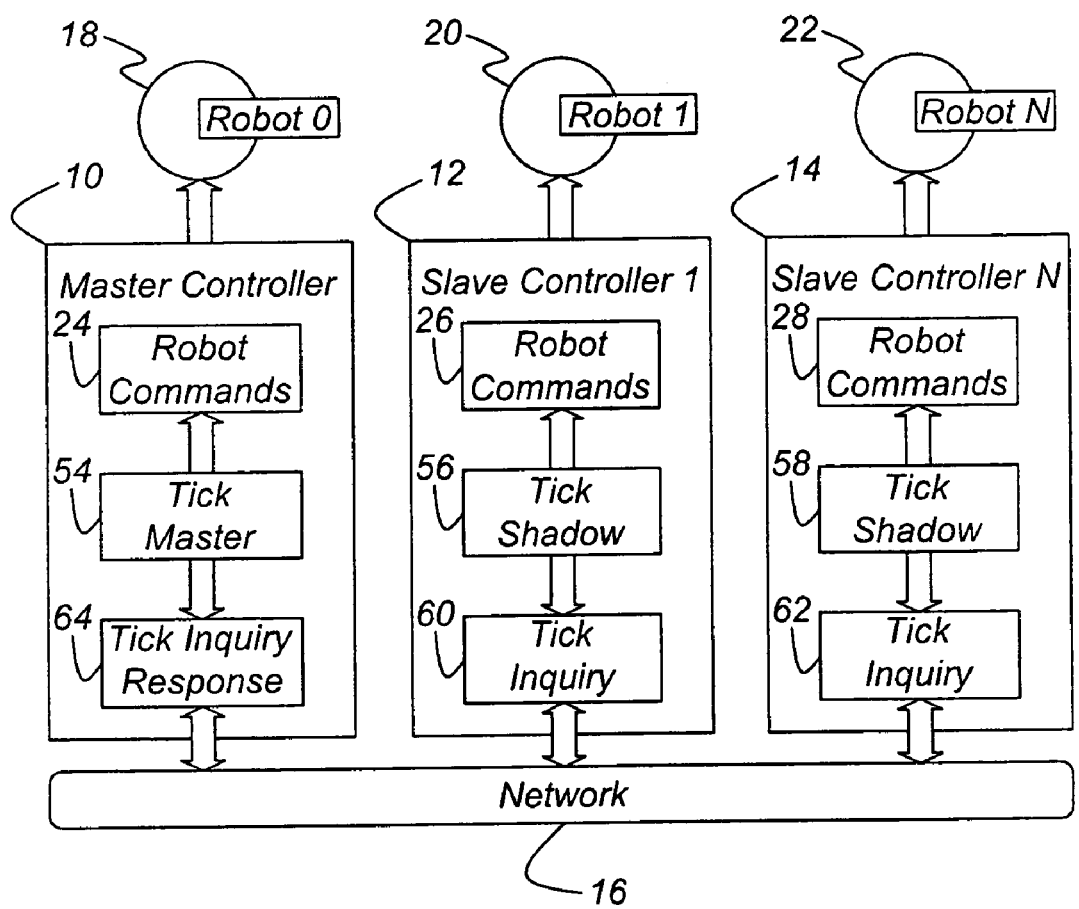
FIG. 1 is a general schematic diagram of a system to which the current invention may be applied.

Referring to FIG. 1, a system according to this invention includes an indefinite number "N" of robot controllers 10, 12, 14 interconnected by a communications network 16, which may be a wireless, optical, or wired network. Controller 10 is a master controller; controllers 12, 14 are shadow controllers. Although FIG. 1 illustrates a system in which each robot controller 10, 12, 14 communicates with one robot 18, 20, 22 respectively, each controller may communicate with several robots. Movement of the robots associated with a respective controller is controlled by commands, preferably in the form of electronic signals that issue repetitively from each controller and are sent to the associated robots. The system coordinates the issuance of the commands from each controller 10, 12, 14 so that each robot of the system receives a command from its respective controller substantially concurrently, such that each robot's movement is synchronized and coordinated with that of the other robots of the system.

Although the invention is discussed with reference to a robotic system, the invention can be applied to the control of other kinds of actuators, which react substantially concurrently in synchronized response to commands issuing from multiple controllers, each of which controls at least one such actuator.

Each controller 10, 12, 14 has a command function 24, 26, 28, which produces the robot commands. The command functions 24, 26, 28 are mutually independent and execute robot control programs, which are sequences of commands that instruct the robots under control of a controller to move to specific locations. The movement of the robots in response to their respective commands is called an event.

Each robot has an arm whose end is supported on several segmented segments connected by articulating joints, which rotate when driven by electric motors in response to the commands from the controller. Articulation of the joints causes the end of the robot's arm to move to a location. Often the robot control programs command additional equipment attached to the robot arm, such as grippers or process equipment. In the case of process equipment, such as paint sprayers, arc welders and the like, the robot motion and the process are closely coupled. For example, a paint sprayer must be actuated to spray paint precisely when the moving robot arm is at a predetermined location adjacent a workpiece to be painted.

Figure 2:
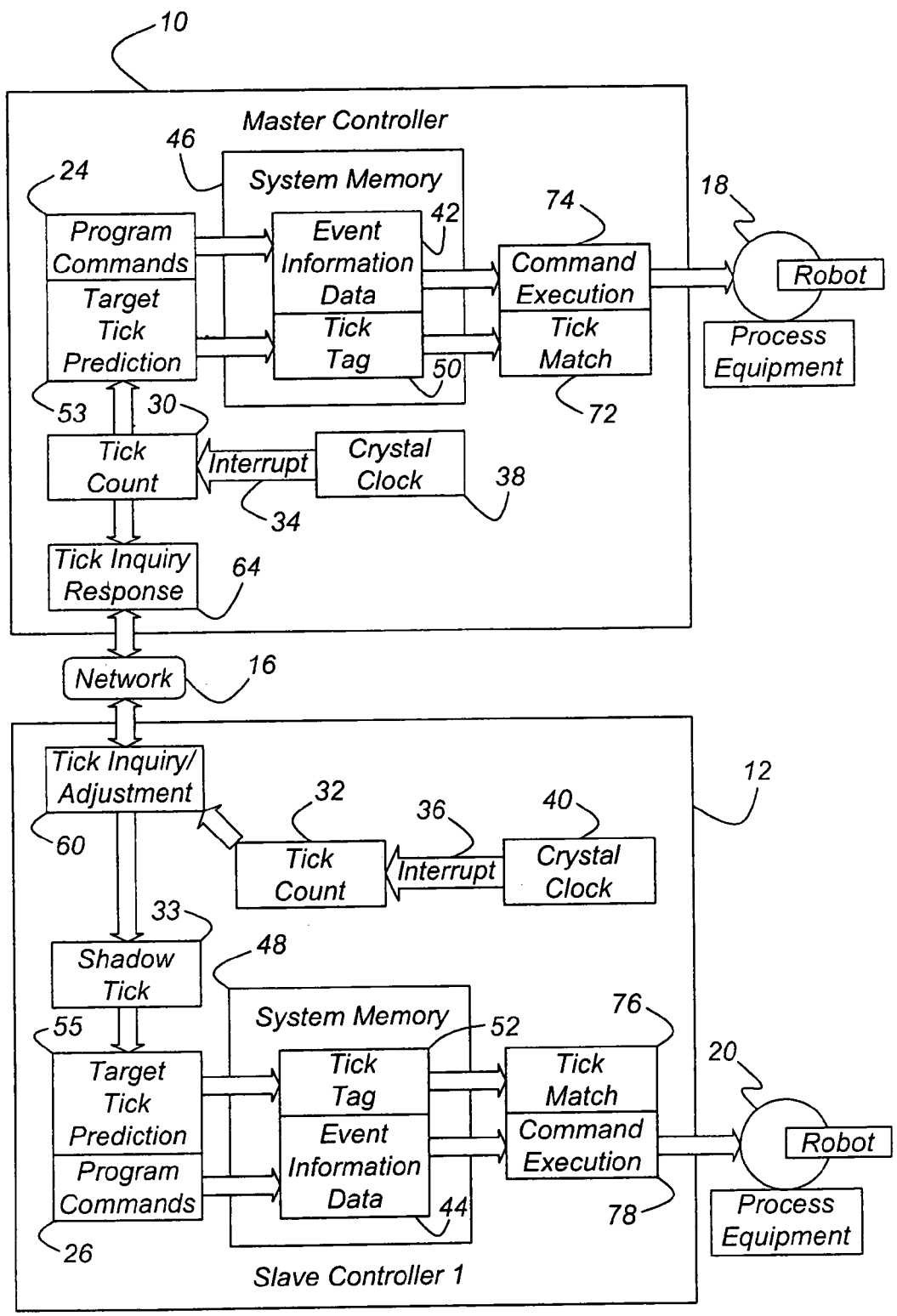
FIG. 2 is a schematic block diagram of the master controller and one slave controller of FIG. 1.

Although FIG. 2 illustrates details of the master controller 10 and one shadow controller 12, the system may include, and the method applies to an indefinite number of shadow controllers. To facilitate precise timing of the actuator commands, coded, computer-readable software resident in each controller provides a tick counter 30, 32, which is coupled by a data bus 34, 36 to a crystal clock 38, 40. Each counter 30, 32, maintains a count of ticks or signals produced by the respective clock 38, 40 at intervals of about every few milliseconds. All of the events that occur in response to a command of each controller 10, 14, 16 are synchronized based on a tick count or shadow tick count on each controller.

Each tick counter 30, 32 provides an integer number that is used by the robot command system to tag event information regarding the event to be executed by the master controller 10 upon the occurrence of a particular count in its tick counter 30 and by the shadow controller 12 upon the occurrence of a particular count in its shadow tick counter 32. Event information 42, 44, which may include the location to which the robot arm is to move at the next event, is resident in controller memory 46, 48. Event information, tagged with a target tick corresponding to the related event, is present at 50, 52 in the corresponding controller memory 46, 48.

The robot command functions 24, 26 are able to predict the target tick count 53, 55 at which a future event will occur. Event information 44 is communicated to the slave controller 12 via the communications network 16 before the event occurs. Preparation of the event information before the event is necessary because standard communications networks have latencies that can exceed twenty milliseconds. Preparation for the event allows all of the controllers to have event information tagged and prepared to trigger at a target tick count before the counters reach each target tick.

The master controller 10 includes a tick master function 54, and the slave controllers 12, 14 each include a tick shadow function 56, 58 as shown in FIG. 1. These functions 54, 56, 58 insure that the tick count 32 on the slave controller is the same as the tick count 30 on the master controller. When robot and process operations need to be synchronized at each controller, the reference tick counts ensure that events occur at the same tick count on each controller.

Tick prediction software repetitively determines the target tick counts at which a system-wide event will occur. It generates the event information and data for each of the system-wide events and tags that information and data with the respective target tick count. That data is communicated to all controllers where it is held until each target tick count occurs. Once the current tick count matches the target tick count, the event triggers and the tagged information and data is executed on all the controller robots at the same tick.

The slave controllers 12, 14 each provide a tick inquiry function 60, 62, which sends a message on the network 16 to the tick inquiry response function 64 on the master controller 10. In response to an inquiry from the slave controllers for the current tick count, the master controller 10 sends the current value of the master tick count 30 to the slave controllers 12, 14.

The inquiry function 60, 62 uses the precise time that the inquiry was sent from the respective slave controller, and the precise time the response was received at the respective slave controller to calculate the length of the transmission period that begins with transmittal of the inquiry and ends with receipt of the response. If the transmission period is longer than a predetermined period, the tick count of the response is disregarded, and a new inquiry is immediately sent. Based on the master tick count response received at each slave controller and the length of the transmission period, a shadow tick count adjustment for each slave controller is calculated as the difference between the master tick count and the slave tick count, plus half the length of the transmission period. This correction or adjustment is applied to the current tick count 32 on each slave controller 12, 14 to determine the shadow tick count 33 on each slave controller. The shadow tick count 33 is thereafter incremented by each tick produced by the clock 40 on the slave controller 12.

To maintain synchronization of the controllers 10, 12, 14, the tick counts 30, 32 on each of the controllers continue to update autonomously, and the shadow tick counts 33, adjusted for the current respective adjustments, update autonomously on the slave controllers 12, 14. Before the target tick count 53 on the master controller 10 is reached, the event command information 42 corresponding to the target tick count will have been identified in the program commands 24 and tagged at 50 with the next target tick count. The tagged event command information 42 on master controller 10 is retained in memory 46 preparatory for the next target tick count to be reached. When the tick count 30 and the target tick count 53 match at 72, the master controller 10 commands execution 74 of the tagged event command information 42 that corresponds to the target tick count 53.

Similarly, before the respective target shadow tick count on each slave controller 12, 14 is reached, the event command information 44 corresponding to the respective target shadow tick count will have been identified in program commands 26 and tagged at 52 with the respective target shadow tick count. The tagged event command information 44 on each slave controller 12, 14 is retained in memory 48 preparatory for the target shadow tick count to be reached. When the shadow tick count 33 and the target tick count 55 on a slave controller 12 match at 76, the slave controller 12 commands execution 78 of the tagged event command information 44 that corresponds to the target tick count 55.

The electronic crystal oscillators in the clocks 38, 40 on the controllers 10, 12, 14 are not precise. Because a standard low-cost hardware system is accurate only to within one part in fifty thousand, over time the tick shadow count 33 will drift with respect to the master tick count 30. In order to accommodate this drift, tick count inquiries are sent periodically to the master controller 10. The tick shadow functions 56, 58 are able to adjust the tick shadow count 33 incrementally to accommodate this clock drift.

Because the clock drift continues at a somewhat constant rate, the adjustment of the tick count occurs at regular intervals. In a typical implementation, the tick count 33 on the slave controller 12, 14 might be adjusted by one tick count about every two minutes of operation. The tick inquiry/adjustment functions 60, 62 on the slave controllers 12, 14 monitor the tick count adjustment and access historical data to determine the average time between adjustments, and the length of the operating period since the last adjustment was made. From this information, the slave controllers 12, 14 estimate the time when the next tick count adjustment will be required. The tick count inquiry from the slave controllers is sent to the master controller at that time.

This estimate is used to calculate the phase of the tick in addition to the magnitude of the required adjustment. Tick match 72 occurs at the instant tick count 30 changes; tick match 76 occurs at the instant tick count 32 changes. Since the controllers all have independent tick counters 30, 32, the tick count 30 on the master controller 10 and the shadow tick count 33 on the slave controllers 12, 14 do not increment at the same instant. This out of phase incrementation can cause an error of plus or minus one tick when the event triggers on the respective controllers. In the best case, the ticks on two controllers increment at exactly the same instant, the error is zero, and the ticks are said to be "in phase." In the worst case, the tick on the shadow controller increments just before or just after the tick on the master controller leading to an error of one tick. The system of this invention monitors the clock drift in order to reduce phase error to one half tick or less.

The method of this invention addresses the non-deterministic nature of standard low cost networks, such as Ethernet. It is impractical to perform a tick inquiry for every tick count. For example, the tick counter might increment every two milliseconds, but it might take as many as twenty milliseconds to send just one message over a standard communications network.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for synchronizing controllers comprising:
a first controller for incrementing a master count of ticks produced at periodic intervals, and for executing event information when the master tick count matches a target tick count;
a second controller for adjusting, with reference to the master tick count, a incremented shadow tick count of ticks produced at periodic intervals, and for executing second event information when the shadow tick count matches the target tick count, the executions by said first and second controllers being mutually synchronized; and
a communications network interconnecting said first and second controllers.

2. The system of claim 1 wherein said first controller further comprises a counter for maintaining the master count, said first controller further determining a target tick count at which an event is to occur on said first controller, and associating the target tick count with the first event information before the master tick count matches the target tick count.

3. The system of claim 1 wherein said second controller further increments the shadow tick count at periodic intervals, determines a target shadow tick count at which an event is to occur on said second controller, and associates the target shadow count with the second event information before the shadow tick count matches the target tick count.

4. The system of claim 1 wherein said first controller further comprises a counter for maintaining the master count, said first controller further determining a target tick count at which an event is to occur on said first controller, and associating the target tick count with the first event information before the master tick count matches the target tick count; and said second controller further incrementing the shadow tick count at periodic intervals, determining a target shadow tick count at which an event is to occur on said second controller, and associating the target shadow count with the second event information before the shadow tick count matches the target tick count.

5. The system of claim 1 further comprising a first robotic actuator operating under control of said first controller; and a second robotic actuator operating under control of said second controller.

6. The system of claim 1 wherein the communications network is at least one of a wired network and a wireless network.

7. In a system of intercommunicating controllers, a method for synchronizing the occurrence of an event on each controller, the method comprising the steps of:
a. maintaining on a master controller a count of ticks produced by a first clock;
b. sending an inquiry from a slave controller to the master controller for the tick count on the master controller;
c. sending a response from the master controller to the slave controller that includes the tick count on the master controller;
d. adjusting a shadow tick count on the slave controller on the basis of the tick count sent from the master controller;
e. incrementing the shadow tick count on the slave controller when ticks are produced by a second clock;
f. establishing a target tick count at which an event is to occur on the master controller and a target shadow tick count at which an event is to occur on the slave controller;
g. using the master controller to command an event when the tick count matches the target tick count; and
h. using the slave controller to command an event when the shadow tick count matches the target shadow tick count.

8. The method of claim 7 wherein:
step b. further includes determining the time when the inquiry is sent from the slave controller; and
step d further includes:
determining the time when the response is received on the slave controller; and
adjusting the shadow tick count on the slave controller by a difference between the tick count received from the master controller and the tick count on the slave controller, plus one-half the length of the period that begins upon sending the inquiry from the slave controller and ends upon receiving the response on the slave controller.

9. The method of claim 7 further comprising a step of maintaining on the slave controller a count of ticks produced by the second clock on the slave controller; and wherein said step e. further comprises using ticks produced by the second clock to increment the shadow tick count.

10. The method of claim 7 wherein said step h. further comprises the steps of:
identifying event information to be executed on the master controller at a future event;
associating the event information with a corresponding target tick count; and
using the master controller to execute the event information that is associated with the corresponding target tick count upon the occurrence of the target tick count on the master controller.

11. The method of claim 7 wherein said step g. further comprises the steps of:
  identifying event information to be executed on the slave controller at a future event;
  associating the event information with a corresponding target shadow tick count; and
  using the slave controller to execute the event information that is associated with the corresponding target shadow tick count upon the occurrence of the target shadow tick count on the slave controller.

12. The method of claim 7 wherein said step b. further comprises:
  determining from prior adjustments of the shadow tick count on the slave controller a desired interval length since the last adjustment on the slave controller;
  determining the duration of a current period that began upon making the last adjustment on the slave controller; and
  determining a fractional tick adjustment from the length of the current period and the desired interval length.

13. The method of claim 7 wherein said step b. further comprises:
  repetitively determining from prior adjustments of the shadow tick count on the slave controller an average of interval lengths since the last adjustments on the slave controller;
  repetitively determining from prior adjustments of the shadow tick count on the slave controller an average of the magnitude of said prior adjustments; and
  determining a fractional tick adjustment from the average of said interval lengths and an average of the magnitude of said adjustments.

14. A method for synchronizing events produced by multiple controllers, the method comprising the steps of:
  a. connecting a master controller to a communications network;
  b. connecting a slave controller to the communications network;
  c. synchronizing an incremented tick count on each controller using the communications network;
  d. determining a target tick count on each controller at which an event is to occur;
  e. preparing event information on the master controller and slave controller to be executed at the next event; and
  f. executing the respective event information on the master controller and slave controller when the tick count on the respective controller matches the target tick count.

15. The method of claim 14 wherein:
  said step b. further comprises connecting multiple slave controllers to the communications network;
  said step e. further comprises preparing event information on each slave controller to be executed at the next event; and
  said step f. further comprises executing the respective event information on each slave controller when the tick count on the respective controller matches the target tick count.

16. The method of claim 14 wherein robotic actuators are subject to the control of at least one of the controllers, and said step f. further comprises controlling the operation of the robotic actuators in response to executing the respective event information on the at least one controller when the tick count on the at least one controller matches the target tick count.

17. The method of claim 14 wherein multiple robotic actuators are subject to the control of each of the controllers, and said step f. further comprises controlling the operation of the robotic actuators in response to executing the respective event information on the master controller and the slave controllers when the tick count on the respective one of the controllers matches the target tick count.

18. The method of claim 14 wherein said step e. further comprises the steps of:
  sending an inquiry from the slave controller to the master controller for the tick count on the master controller;
  sending a response from the master controller to the slave controller that includes the tick count on the master controller; and
  adjusting a tick count on the slave controller on the basis of the tick count sent from the master controller.

19. The method of claim 14 wherein said step e. further comprises the step of receiving on the slave controller event information sent on the communications network from the master controller before the tick count matches the target tick count.

20. The method of claim 14 wherein said step c. further comprises the steps of:
  referencing the target tick count to the respective event information; and
  receiving on the slave controller the event information sent on the communications network from the master controller before the tick count matches the target tick count.

* * * * *

UNITED STATES PATENT AND TRADEMARK OFFICE
CERTIFICATE OF CORRECTION

PATENT NO. : 7,149,606 B2  Page 1 of 1
APPLICATION NO. : 11/069126
DATED : December 12, 2006
INVENTOR(S) : Krause It is certified that error appears in the above-identified patent and that said Letters Patent is hereby corrected as shown below:

On the Title Page, section 73 Assignee should read

Item 73
--(73) Fanuc Robotics America, Inc.

Signed and Sealed this

Fourth Day of March, 2008

JON W. DUDAS
*Director of the United States Patent and Trademark Office*